(No Model.)

E. P. BREWER.
SNAP HOOK.

No. 551,753.

Patented Dec. 24, 1895.

Witnesses
Alonzo H. Luther
John E. Luther

Inventor
Edward P. Brewer.
By Attorney
Frank H. Allen

UNITED STATES PATENT OFFICE.

EDWARD P. BREWER, OF NORWICH, CONNECTICUT.

SNAP-HOOK.

SPECIFICATION forming part of Letters Patent No. 551,753, dated December 24, 1895.

Application filed January 23, 1895. Serial No. 535,867. (No model.)

*To all whom it may concern:*

Be it known that I, EDWARD P. BREWER, a citizen of the United States, residing at Norwich, New London county, State of Connecticut, have invented certain new and useful Improvements in Snap-Hooks, which improvements are fully set forth and described in the following specification, reference being had to the accompanying sheet of drawings.

This invention is in the class of snap-hooks commonly employed in connection with hitch-reins, halters, &c., said hooks serving when in use to secure the free end of such hitch-reins or of the line of such halters to some suitable fixed object.

It is a common practice, in securing a horse to a post, to take one or more turns of the hitch-rein around the said post and then to secure its free end (close to the said post) by means of its snap-hook or by tying to that portion of the hitch-rein leading to the horse's head. The almost constant movement of the horse, first pulling on said rein and then releasing the tension thereon, serves after awhile to loosen somewhat the turn or turns of the hitch-rein encircling the post, and, as a result, said turns work gradually downward thereon. It is frequently the case that the hitch-rein thus works so far downward on the post that the horse is obliged to correspondingly lower his head, and if not relieved may be compelled to remain in this position some little time, experiencing on some occasions much discomfort thereby.

It is my object in this invention to produce a device by means of which the difficulty just recited shall be obviated, and with this end in view I have provided the snap-hook described in the following specification, the construction of which is such that the same will serve when in use to cause the turn or turns of the hitch-rein encircling the post to ever bind upon said post, regardless of any strain or movement which the horse may apply to said hitch-rein, and thus any tendency of the same to slip on the post, as above, will be prevented.

Figure 1:
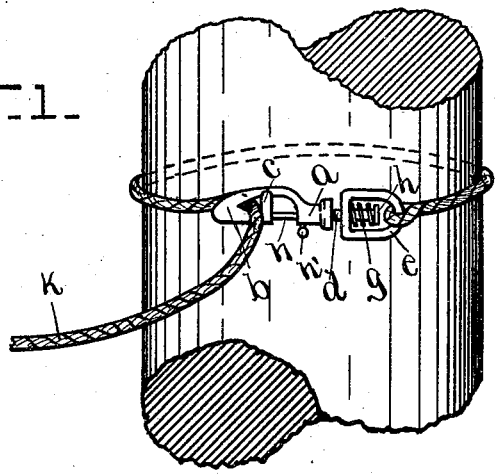
Figure 2:
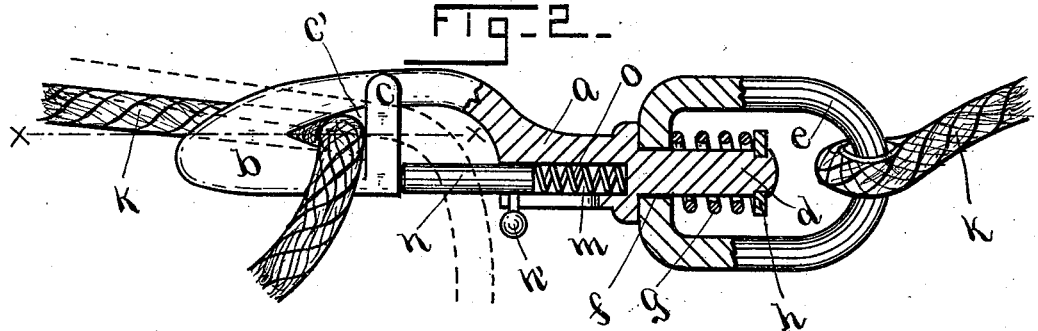
Figure 3:
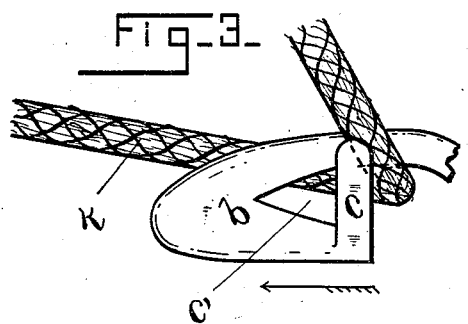
Figure 4:
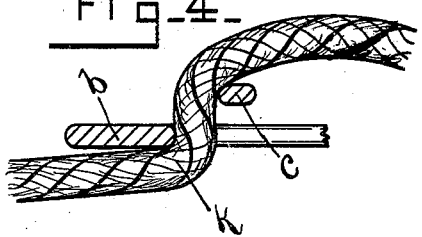
Figure 5:
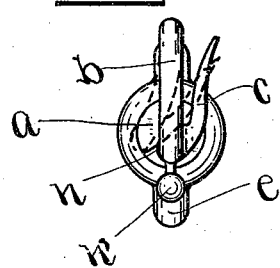

To assist in the explanation of my invention I have provided the accompanying drawings, which serve to illustrate the same as follows:

Figure 1 shows the manner in which my device serves, when in operation, to secure the hitch-rein to a post. Fig. 2 is an enlarged detached view of said device, partly in section. Fig. 3 illustrates the manner in which the same is operated. Fig. 4 is a sectional view taken on line $xx$ of Fig. 2. Fig. 5 shows the manner in which certain elements of my device are assembled.

Referring now to the drawings, the letter $a$ indicates what I have termed the "body portion" of my snap-hook, the same being substantially cylindrical in shape. Extending from one end of body portion $a$ is a flattened hook-shaped piece $b$, the thickness of which is preferably much less than the diameter of the said body portion. The free end of hook $b$ is formed as a lip $c$, which latter extends at right angles to the general direction of the hook in such manner as to form an angular eye $c'$. Extending from the opposite end of the body portion $a$ is a shank $d$.

$e$ indicates a ring or link one end of which is provided with a hole $f$ through which the shank $d$ passes into said link. A spiral spring $g$ is mounted on the shank $d$ and a washer $h$ secured to the free end of said shank serves to confine said spring between itself and the link, as seen in Fig. 2. Spring $g$ serves by its tendency to expand to hold in close proximity the body portion $a$ and the link $e$, to which latter one end of the hitch-rein is secured in any suitable manner. Said hitch-rein usually consists of a piece of rope, and I have therefore so shown it in the drawings, the same being denoted by the reference-letter $k$.

Assuming that a device constructed as illustrated and described has been provided and that it is desired to use the same to secure the hitch rein or rope $k$ to a post, as already mentioned, one or more turns of the rope are first taken around the post, as shown in Fig. 1. Rope $k$ is then drawn across the hook-shaped piece $b$, (dotted lines, Fig. 2,) and then doubled back upon itself and drawn under the lip $c$ and into the angular eye $c'$, as seen in Figs. 3 and 2, respectively. The lip $c$ serves to retain the rope $k$ within the eye $c'$, which latter is of such size that when rope $k$ has been forced therein the same will be wedged in said angular eye.

It will be seen by reference to Fig. 4, that when rope $k$ is in position within the eye as just explained, a sharp angle will have been formed in the rope, which angle and the wedging of said rope in the eye $c'$ will prevent the rendering of rope $k$ through said eye $c'$. The operation of forcing the rope into the eye will have a tendency to draw forward hook $b$ (in the direction of the arrow of Fig. 3) against the force of spring $g$. As soon, however, as said operation is completed the spring $g$ at once expands sufficiently to take up all slack that may exist in the turn or turns of the rope $k$ encircling the post and also cause said turn or turns to bind upon said post, as readily understood by reference to Fig. 1.

It has now been shown that the rope $k$ is prevented from slipping or rendering through the eye $c'$ by reason of the wedge shape of the eye and of the sharp angle which is formed in said rope and it has also been shown that the turn or turns thereof encircling the post are caused by reason of spring $g$ to bind upon said post, and, as a result, any tendency of the rope to slip downward will be also prevented. It will therefore be readily understood that rope $k$ will ever remain in the position in which it is secured to the post, regardless of any movements of the horse.

The lip $c$ may be formed as a rigid part of the hook $b$, or it may be a spring-lip, in which latter case rope $k$ may be more effectually inclosed by the eye $c'$ than it would if the lip $c$ were rigid. If desired body portion $a$ may be chambered, as at $m$, for the reception of a sliding bolt $n$ and its operating-spring $o$. Bolt $n$ is provided with an operating-handle $n'$. When my device is fitted up with the bolt $n$ said bolt will serve to close the opening of hook $b$ in such manner that my device may be used in the same manner as other snap-hooks when it is desired to "snap" the same into an ordinary hitch-ring.

In order that the bolt $n$ and its spring $o$ may be quickly assembled, hook $b$ may be sprung or twisted aside sufficiently to permit of the spring $n$ and bolt $o$ being dropped into place in the chamber $m$. The hook $b$ when released at once springs back to its normal position, thereby preventing the bolt from dropping from its chamber when the same is forced outward by the spring $o$, the manner in which said parts are assembled being readily understood by reference to Fig. 5, (dotted lines.)

My device as a whole is extremely simple in its construction, is very useful for the object for which it was designed and at the same time may be very cheaply produced.

Having thus described my invention, I claim—

1. A snap-hook formed with an elongated, headed, shank, a link swiveled on said shank and a spring mounted on said shank between the shank-head and the inner end-wall of said link, all combined substantially as and for the purpose specified.

2. In a snap-hook, the hook member provided with a lip, whereby the hitch-rein is prevented from slipping, in combination with a wedge-eye, a sliding link, secured to the shank of said hook and a coil spring for returning the link and hook to their normal relative positions, as shown and described.

3. In a snap-hook, in combination, the hook $b$ formed with a wedge-shaped opening, lip $c$, spring-actuated bolt $n$ abutting the side of said lip opposite to said opening, shank $d$ with coil spring $g$ and link $e$ mounted thereon as set forth, and hitch-rein $k$, all substantially as specified.

EDWARD P. BREWER.

Witnesses:
ALONZO M. LUTHER,
EDWARD A. WARNER.